United States Patent [19]

Sornik

[11] Patent Number: 4,659,749

[45] Date of Patent: Apr. 21, 1987

[54] CASTING MIXTURE COMPRISING CHINA CLAY, SILICA AND AN STYRENE-ACRYLIC COPOLYMER LATEX

[76] Inventor: Marshall E. Sornik, 8200 Shore Front Pkwy., Rockaway Beach, N.Y. 11693

[21] Appl. No.: 766,499

[22] Filed: Aug. 19, 1985

[51] Int. Cl.$^4$ .............................. C08K 3/34; C08K 3/36
[52] U.S. Cl. ..................................... 523/122; 523/334; 524/446
[58] Field of Search ................ 523/122, 334; 524/446

[56] References Cited

U.S. PATENT DOCUMENTS 3,956,217  5/1976  Gazeley ............................ 524/458
4,073,999  2/1978  Bryan et al. ....................... 428/332
4,409,276  10/1983  Martinelli et al. ................ 428/168

FOREIGN PATENT DOCUMENTS 0083985  5/1985  Japan ................................ 524/446
0108480  6/1985  Japan ................................ 524/446
0185869  9/1985  Japan ................................ 524/446

Primary Examiner—Herbert J. Lilling
Attorney, Agent, or Firm—McAulay, Fields, Fisher, Goldstein & Nissen

[57] ABSTRACT

A casting mixture comprises a ceramic slip and a styrene/acrylic copolymer latex emulsion which provides unique properties and does not require firing.

4 Claims, No Drawings

CASTING MIXTURE COMPRISING CHINA CLAY, SILICA AND AN STYRENE-ACRYLIC COPOLYMER LATEX

FIELD OF INVENTION

This invention relates to ceramic casting mixtures and more particularly to a ceramic casting mixture which when hardened and removed from its mold, does not require firing to achieve permanence of the article.

BACKGROUND OF THE INVENTIONS

Heretofore various ceramic casting mixtures have been devised which incorporate finely divided clay, silica and the like mixed with water to form a slip. The slip is poured into a mold in which it is permitted to harden sufficiently to achieve the structural integrity requisite to permit removal therefrom without breaking the newly cast article. After the article is dried sufficiently, it is fired in a kiln for several hours to increase the strength of the article sufficiently for permanence thereof. Subsequent steps may involve decorating and coating the article with a glaze, refiring etc.

In accordance with the present invention, it has been discovered that ceramic articles can be created which have greater structual integrity than traditionally fired ceramic articles without firing. Articles produced according to the new method have great ability to withstand impact, are relatively impervious to moisture and have an attractive finished surface. The casting mixture which is the subject matter of the present invention, is easy to mix and is readily adapted to conventional casting techniques. The cast article does not require firing, is therefore not subject to failure during a firing process, and thus is considerably less expensive to manufacture. The percentage of rejects is minimal.

The casting mixture of the invention incorporates conventional ceramic clays which form the majority of the overall mixture and the appearance of the finished article is quite similar to the appearance of traditionally cast ceramic articles. However, to the conventional clay slip is added a copolymer latex which imparts in addition to the physical qualities already prescribed, a patina to the surface of the finished article which when used in the manufacture of dolls, creates a lifelike effect. This characteristic can be augmented by the addition of pigment to the mixture.

SUMMARY OF THE INVENTION

In accordance with the present invention, a casting mixture has been devised which utilizes a ceramic based slip; for example, a china clay/silica slip in combination with an emulsion from the chemical family of polymeric esters, more specifically a styrene acrylic copolymer latex. The latter is mixed with the ceramic slip to have a proportion of from 5% to 35% by volume, 15%-20% by volume, being preferred. The method of the invention comprises taking the aforesaid casting mixture pouring an article in a mold in the conventional manner, removing the article from the mold when the mixture has sufficient structural integrity (usually after 45 to 60 minutes) treating imperfect surface areas such as pin holes or other depressions with the casting mixture immediately after removal of the article from the mold and permitting the article to air harden for 24-48 hours. After hardening the article, it can be polished and painted if desired.

DESCRIPTION OF PREFERRED EMBODIMENT(S)

One selection of constituents which has proved successful in practicing in the present invention comprises mixing china clay and silica with water to form a slip whose consistency will vary depending upon the thickness of the article to be cast, the internal dimensions and the definition of the mold and so on. Generally speaking, china clay should be in the overall proportion of 30 to 60 percent by weight, silica 5 to 10 percent by weight, and water 30 to 60 percent by weight. For most purposes, ideal proportionate amounts of these constituents of the slip may be the following: China clay, 55%; silica, 5%; and water, 40% (all by weight.)

To the foregoing mixture which is a traditional china clay/silica casting mixture, shall be added, an emulsion comprising a styrene/acrylic copolymer latex. This emulsion is found in the chemical family of polymeric esters and may also be described as a carboxylated acrylic copolymer emulsion (the emulsion is sold by National Starch & Chemical Corporation, Bridgewater, N.J. 08807 as Nacrylic 78-6193). Such emulsion should comprise 3% to 35% of the total volume, with approximately 20% being the norm. It has been found that when the mixture contains proportional amounts of the emulsion greater than 25%, the mixture tends to coagulate and the resulting mixture is not recommended for casting articles but rather may be used as a modeling material. For simplicity in describing the mixture of the invention, however, the term "Casting Mixture" shall continue to be used therein since this is its principal use.

In addition to the foregoing constituents, a small quantity of bactericide and pigment (a dye suitable for latex) may be used.

Typical properties of the above emulsion are the following:
1. Appearance: milky white liquid
2. Non-volatiles: 50%
3. ph: 6.5
4. Viscosity: 100 cps
5. Particle Size: 0.15
6. Particle Charge: anionic
7. Latex Density: 8.5 lbs./gal.

The following is recommended in practicing the present invention; for example, in casting articles such as the heads of dolls and the like.

1. Prepare a china/silica slip having the proportionate percentages set forth above.

2. Add emulsion to the slip while stirring gently until about 15%-20% by volume of the emulsion has been added. Care should be exerted to mix without frothing, since the formation of bubbles in the mixture is to be avoided. Hardening of the mixture after casting occurs by exposing the cast article to air.

3. Assuming that the casting mixture of the invention has been prepared as described, normally, the quantity immediately required may be transferred into another container (e.g. a pitcher) for easy handling and for pouring one or more molds. Note: if the individual requirements of the mold or cast article require a thinning of the mixture, a small quantity of water should first be added and stirred into the mixture (say, 1oz. of water per gallon) taking care to stir without the creation of bubbles.

4. Pour the mixture into the pour hole of a clean mold (use a soft brush to clean the interior of the mold) pouring slowly and steadily, filling the mold to the top. Keep the pour hole filled, adding the mixture as needed until a shell of say ⅛" to ¼" forms within the mold. This should take about 15-20 minutes, but under conditions of high humidity or where the mold has been used repeatedly on the same day, a longer period will be required.

5. After the desired shell thickness has been formed, the excess slip is poured from the mold by pouring with the mold seam vertical and slowly pouring to prevent collapsing of the shell.

6. Allow the mold to dry for at least 45-60 minutes before opening. If the mold doesn't separate easily, additional time will be required.

7. After removal of the cast article, the surface thereof should be carefully examined for evidence the surface of the article for imperfections such as "pin holes" from bubbles and the like. These can be eliminated by applying some of the casting mixture to the affected surface area while the article is still moist, immediately after removal from the mold. A damp sponge should be used to smooth imperfections and seams can be trimmed with a sharp trimming knife or may be sanded.

8. Allow the article to dry 24-48 hours. Curing can be expedited by placing the article in an oven at a temperature of no more than 300° F.

9. After drying, the article can be polished. If the cast article is a doll or doll head, polishing will produce a unique flesh tone (if pigment has been added to the mixture) reminiscent of the old masters' antique dolls. The article should be buffed with a soft cloth or paper towel to a polished finish and can be sprayed thereafter with matte krylon to seal the surface. The article can also be painted if desired.

It will be understood that the foregoing description relates to a specific embodiment or embodiments of the invention and is therefore representative. In order to understand fully the scope of the invention, reference should be made to the appended claims.

What is claimed is:

1. A casting mixture for forming ceramic articles comrising a ceramic slip, said slip being formed with from 30% to 60% by weight china clay, from 5% to 10% by weight silica, and from 30% to 60% by weight water; and in combination therewith an emulsion of a styrene acrylic copolymer latex, said emulsion comprising from 3% to 35% of the mixture by volume.

2. The casting mixture of claim 1 in which the percentage of said emulsion is from 15% to 25% of the mixture by volume.

3. The casting mixture of claim 2 which further includes a bactericide and a dispersed pigment dye for latex.

4. The casting mixture of claim 1 wherein said ceramic slip comprises approximately 55% china clay, approximately 5% silica, and approximately 40% water, by weight.

* * * * *